Patented Sept. 19, 1939

2,173,346

UNITED STATES PATENT OFFICE 2,173,346

PHENOLIC RESINOUS PRODUCT

Victor H. Turkington, Caldwell, and William H. Butler, Arlington, N. J., assignors to Bakelite Corporation, New York, N. Y., a corporation of Delaware No Drawing. Application October 19, 1935, Serial No. 45,778

5 Claims. (Cl. 260—51)

This invention relates to synthetic phenolic resinous products and comprises such products that are found to have the highly useful property of being compatible with fatty oils, such as tung oil, linseed oil, rapeseed oil, castor oil and similar oils, including as well varnishes and other coating compositions prepared therefrom to yield coatings that are characterized by toughness, flexibility, adhesiveness and durability.

The commonly known resinous products obtained in the condensation of phenol or cresol with formaldehyde or equivalent methylene-containing agents have the properties of durability and resistance to water, acids and other corrosive or destructive influences which make them desirable for coating compositions; but they are not suitable as such for coating compositions on account of their hardness and brittleness, and furthermore they are known to be insoluble in fatty oils. It has been proposed to make them soluble in or miscible with fatty oils by fusing them with rosin, but the presence of rosin detracts from the desirable properties of phenolic resinous products in proportion to the relative amount present.

The present invention is based on the discovery that the degree of solubility or miscibility of phenolic resinous products in fatty oils depends largely on the phenolic body used in their preparation. In general they are resinous products of a methylene-containing agent condensed with phenolic bodies or higher phenols substituted, particularly in the para position by alkyl or aryl groups and with molecular weights of about 122 or higher; such are xylenol mixtures, p-tertiary butyl phenol, p-tertiary-amyl phenol, p-octyl phenol, p-benzyl phenol, etc. as representative of phenols substituted by alkyl groups or multiples of them having two to eight carbon atoms in the substituents; multiple ring phenols as p-hydroxy-diphenyl, o-hydroxy-diphenyl and homologs, dicresols, dithymols, etc. cyclo-hexyl phenols as methyl-cyclo-hexyl phenol, etc. are indicative of phenols substituted by aryl groups with five and more carbon atoms in the substituents. The resinous products prepared from these phenols are characterized by solubility or miscibility with fatty oils without the addition of a solubilizing agent as rosin or other treatment, and show an increasing degree of solubility with increase in the molecular weight of the phenolic body from which they are made.

The reaction of such substituted phenols with a methylene-containing agent is preferably with the latter in amounts from one to three mols for each mol of phenol; formaldehyde in aqueous solution (37.5%) is commonly used as the methylene-containing agent, but anhydrous forms of formaldehyde as para-form, compounds releasing formaldehyde as hexamethylenetetramine, higher aldehydes as acetaldehyde, etc., ketones as acetone, etc. may be substituted. Catalysts for the reaction can be used of either the basic or the acid type, or catalysts can be omitted particularly when pressure above atmospheric is applied to speed up the condensation reaction. As basic catalysts, strong bases such as caustic soda, ammonia, etc. or weak bases such as sodium carbonate are suitable depending upon the speed and degree of reaction desired; basic catalysts are used in relatively small proportions (less than one-fifth of a mol based on the phenol), for larger percentages of bases and approaching molar proportions calculated on the phenol, result in phenolates which in turn react with formaldehyde to yield phenol alcohols or saligenin; the course of this reaction is not affected by the inclusion of aldehyde in excess of equimolecular proportions, and the alcohols on heating or under acid conditions change to saliretins of a nondescript character which from a practical standpoint and in view of their lack of desirable properties are not regarded as belonging to the heat-reactive type of resins that become infusible under the action of heat. With acid catalysts such as the strong mineral acids as hydrochloric, or the mild organic acids as oxalic, lactic, etc. the percentages used are from 1–2% for strong acid and up to 4% for the organic acid based on the weight of phenol; the tendency with acid catalysts alone is toward the formation of resins of the novolak type which do not readily harden under the action of heat, and this tendency is more marked with the higher substituted phenols so that an excess of the phenol above equimolecular proportions with formaldehyde is not required in the resin reaction to avoid the danger of producing an infusible resin. Associated with acid condensation products prepared from the higher substituted phenols are the production of high molecular weight resins (resin prepared from p-phenyl phenol has an indicated molecular weight approximating 700) which are not chemically reactive with acids or esters, and the improved resistance found in films of these resins in oils can be ascribed to the chemical resistance of the resin and the further fact that the resin apparently acts as an oxygen inhibitor as the film ages; the improved rapidity found in drying of the films is ascribable to the decrease in oxidation and a corresponding increase in polymerization. After the resin reaction has been initiated the catalyst, particularly a basic catalyst, can be neutralized to give better control of reaction conditions or to import properties such as improved color, etc. into the resin.

Hydroxydiphenyl resinous products are particularly desirable for use with fatty oils in coating compositions on account of their excellent resistance to water and their stability or permanence of color while under the influence of light and oxidation; they are thus distinguished from many other phenolic resinous products which darken upon exposure to light and air. The para-hydroxydiphenyl resinous products particularly are further characterized by hardness and high melting points and therefore advantageous for coatings exposed to high temperatures; for example, their high melting points and their resistance to moisture make them desirable in coatings for furniture and the like that must withstand hot and humid atmospheric conditions and remain free from tackiness or "printing". These resinous products are further distinguished from the commonly known phenol and cresol resinous products in that they are not as readily polymerized to insoluble, infusible bodies by heating; they may be subjected to heat at temperatures as high as 200° C. and remain fusible and soluble even when the usual excess of methylene-containing agents is employed in the condensation. This tendency on the part of hydroxydiphenyl resinous products to remain unpolymerized when heated is advantageous in cooking with fatty oils to produce oil varnishes, for they do not separate out of solution or cause jelling of the entire mass as is the case with the usual phenol and cresol resinous products.

In the manufacture of oil varnishes from the resinous bodies to which this invention is directed, the methods and proportions generally used may be followed, the usual range of proportions is from one of resin to one of oil by weight up to one of resin to five of oil. The resinous product is dissolved in a fatty oil by heating and the heating continued until the desired viscosity or "body" is obtained. Or the condensation of the phenolic body with a methylene-containing agent can be carried out in the presence of a fatty oil, the water removed and the mass thickened to the desired viscosity. Suitable solvents, such as petroleum thinner, turpentine and other solvents commonly used in varnish, and driers if desired, are then added and after cooling the varnish so formed is ready for use. Varnishes prepared in this manner are fast in drying (about 20 minutes with customary solvents) to a non-tacky condition; this property in conjunction with the properties of flexibility, toughness, adhesiveness and resistance to weather conditions inherent in them peculiarly adapt them for coating leather, fabrics, etc., used for auto tops and similar products, and for all outdoor purposes.

The following examples are given to illustrate the invention, but it is to be understood that the proportions and ingredients are not limited to those specifically mentioned. All parts are by weight.

*Example 1.*—100 parts of para-hydroxydiphenyl and 100 parts of commercial formaldehyde, either with or without acid or alkaline condensing agents, are heated in a closed container under pressure to a temperature of about 120° C. or more until the condensation is substantially complete. The water is then removed by heating at atmospheric or reduced pressure. The product obtained by this procedure is a hard, clear, light-colored resinous material, melting at about 150° C. or higher and is readily soluble in tung oil and other fatty oils.

Ortho-hydroxydiphenyl can be substituted for the para-hydroxydiphenyl to yield hard clear light amber colored materials which melt at about 80° C. Or the two can be mixed in varying proportions to give resinous products having any desired melting point ranging from 80° C. and upward.

*Example 2.*—100 parts of para-hydroxydiphenyl and 25 parts of hexamethylenetetramine are heated together in an open vessel or in a vessel provided with a reflux condenser. The ingredients fuse at about 130° C. and react with evolution of ammonia. As the reaction proceeds the melting point of the mass increases and very hard, high-melting products are obtained if the heating is continued to 200° C. or above, which products remain soluble in fatty oils. As in the above example, ortho-hydroxy-diphenyl may be substituted in whole or in part, or the commercially available mixtures can be used to yield oil-soluble products of varying melting point.

*Example 3.*—100 parts parahydroxydiphenyl, 100 parts commercial formaldehyde and 100 parts tung oil, with or without acid or alkaline condensing agent, are heated together in a closed vessel under pressure to about 120° C. and maintained at that temperature until condensation is substantially complete. Water is thereupon removed by heating at atmospheric or reduced pressure and the mass is further heated up to a temperature of about 200° C. until the desired consistency is reached. Metallic driers may be included if desired. When the product is dissolved in suitable solvents, a varnish is obtained that is characterized by rapid drying and excellent resistance to weathering, moisture and other destructive influences. Ortho-hydroxydiphenyl or its admixtures with para-hydroxydiphenyl can be similarly treated.

*Example 4.*—100 parts of a hydroxy-diphenyl, 90 parts of furfural and 1 part sodium carbonate are heated together under a reflux condenser to the desired consistency. This product is soluble in fatty oils and suitable for preparing dark colored varnishes.

*Example 5.*—100 parts of a hydroxy-diphenyl, 100 parts acetaldehyde and 1 part commercial hydrochloric acid are refluxed together. The mass is dehydrated to yield an oil-soluble product.

*Example 6.*—37 parts of parahydroxy-diphenyl and 7 parts of hexa are heated together. The mixture thickens and ammonia is evolved; in about 10 minutes a viscous fusible resin is obtained which on dehydration and further heating for about one-half hour at 125° C. gives a hard, brittle resin melting at about 170–180° C.

*Example 7.*—147 parts of purified para-tertiary butyl phenol and 118 parts of 37.5% formaldehyde solution are reacted in the presence of 4 parts of oxalic acid for about 70 minutes at about 92–94° C. The mass is dehydrated to a boiling temperature in the resin of about 165° C. yielding a water white resin. About 161 parts of the resin is added to 290 parts of tung oil (acid number 8), heated to a clear body at 200° C. and then chilled with 319 parts of Varnolene. The liquid varnish can be diluted with thinners such as 80 parts of Cellosolve (monoethyl ether of ethylene glycol), 19 parts of xylol, and driers comprising 1.14 parts of lead resinate and 0.75 part manganese resinate can be included. This gives a brushing varnish of pale straw color. A varnish so made when air-dried on steel tested very fast to light and good resistance to weather.

*Example 8.*—147 parts of purified para-tertiary butyl phenol and 118 parts 37.5% formaldehyde solution are reacted in the presence of 6 parts of solid sodium hydroxide as catalyst at 92–94° C. for about 50 minutes and dehydrated to a temperature of 140° C. in the mass. The resin formed is heat-reactive and tests alkaline in water solution. A varnish is made from 110 parts of the resin and 200 parts of tung oil (neutral) and heated together at 250° C. to a viscous mass. 210 parts of Varnoline is added as in the foregoing Example 7. The varnish is somewhat dark in color but has good body and weather resistance.

*Example 9.*—The ingredients of Example 8 are initially reacted as there described. At the end of the initial reaction 15 grams of lactic acid are added to neutralize the mass and the resin layer separates from the water and salt layer. The resin is heat-reactive and dehydration is carried on under a vacuum to avoid polymerization. A varnish is made from the resin as in the preceding example giving a very light colored and light resistant product.

*Example 10.*—100 parts of methyl-cyclo-hexyl phenol and 48.4 parts of formaldehyde are refluxed together in the presence of 1.93 parts of oxalic acid for about 7 hours and dehydrated to a temperature of 120° C. A water white non-heat-hardening resin is obtained melting at about 287° F. From the resin a varnish is made by cooking 100 pounds in 258 pounds of tung oil to about 465° F. in about 50 minutes, and hold until varnish strings and reduce with about 200 pounds of mineral spirits and 21 pounds of xylol. Driers are added such as about 2 grams of a mixture of lead, manganese and cobalt naphthenates. This gives a pale durable spar varnish and a film dries in air hard enough for recoating within 4 hours.

*Example 11.*—100 parts of octyl phenol is refluxed with 43.2 parts of formaldehyde with 1.73 parts of oxalic acid. The resin separates in about 12 hours, and it is dehydrated to 165° C. The resin obtained is soft which upon heating to 210° C. becomes brittle and about water white in color; it melts at about 163° F. When made into a varnish of 100 pounds of resin to 258 pounds of tung oil with thinners and driers as in the preceding example a clear product is obtained of about similar properties.

*Example 12.*—100 parts of para-benzyl phenol is refluxed 8 hours with 48.4 parts of formaldehyde and 1.93 parts of oxalic acid. A brittle solid resin with a melting point of about 142° F. is obtained which forms a varnish with a drying oil as in the above.

In a series of comparative studies of the effects of resins made from substituted phenols in accordance with this invention with ester gums for example it is found that the resins have a marked tendency to accelerate gelation; tung oil with ester gum shows no tendency to reach the solid phase within 5 hours at 300° C., but a tung oil with 10% of a resin as herein described reaches a final gelation in about one-half hour. Likewise the effect on viscosity increase is contrary to that of ester gum; tung oil heated at about 232° C. requires 66 minutes to reach a viscosity of 200 centipoises, tung oil with 20% of a substituted phenol resin requires 57 minutes, while tung oil with the same percentage of ester gum requires 93 minutes, and with rosin 139 minutes.

The examples given describe synthetic resinous products prepared from phenolic bodies of higher molecular weight without admixtures; but other resinous materials, such as natural resins or novolaks, can be included either by addition to the raw ingredients or by incorporation with the finished reaction product. Among the natural resins found suitable may be mentioned rosin or colophony, copals, elemi, mastic, etc. Such additions of natural resins are mainly useful in reducing the cost of the product, but otherwise are generally undesirable as they lower the quality, greatly reduce the resistance to weathering and increase the drying time.

This application is a continuation in part of application Serial No. 336,007, filed January 29, 1929, Patent No. 2,017,877.

We claim:

1. A process for producing a soluble condensation product capable of undergoing further substantial condensation on the application of heat and of forming uniform homogeneous products when reacted with an excess of substantially neutral resins, drying oils or mixtures thereof, which process comprises reacting (1) a phenol substituted in the para-position by a hydrocarbon radical having four to seven carbon atoms, in the absence of unsubstituted phenol and (2) a substantial excess of formaldehyde over the equimolecular proportion, the reaction being carried out with the aid of a strong alkaline catalyst.

2. A condensation product derived from (1) a phenol substituted in the para-position by a hydrocarbon radical having four to seven carbon atoms in the absence of unsubstituted phenol and (2) a substantial excess of formaldehyde over the equimolecular proportion, said condensation product being capable of undergoing further substantial condensation on application of heat, and of forming uniform homogeneous products when reacted with a multiple proportion of substantially neutral resins, of drying oils or mixtures thereof, which products are distinguished by their substantially higher viscosity as compared with the neutral resins and drying oils themselves.

3. An oil soluble condensation product obtained by condensing (1) a phenol substituted in the para-position by a hydrocarbon radical having 4 to 7 carbon atoms, in the absence of unsubstituted phenol, and (2) a substantial excess of formaldehyde over the equimolecular quantity with the aid of an alkaline catalyst, said product being capable of undergoing further substantial condensation by the application of heat and of forming a uniform homogeneous product when reacted with a substantial excess of fatty oils, substantially neutral resins, waxes or mixtures thereof.

4. A process for producing a soluble condensation product capable of undergoing further substantial condensation on the application of heat and of forming uniform homogeneous products when reacted with an excess of substantially neutral resins, drying oils or mixtures thereof, which process comprises reacting (1) a phenol substituted in the para-position by a hydrocarbon radical having four to seven carbon atoms, in the absence of unsubstituted phenol and (2) a substantial excess of formaldehyde over the equimolecular proportion, the reaction being carried out with the aid of an acid catalyst.

5. A condensation product derived from (1) a phenol substituted in the para-position by a hydrocarbon radical having four to seven carbon atoms in the absence of unsubstituted phenol and (2) a substantial excess of formaldehyde over the equimolecular proportion with the aid of an acid catalyst, said condensation product being capable of undergoing further substantial condensation on application of heat, and of forming uniform homogeneous products when reacted with a multiple proportion of substantially neutral resins, of drying oils or mixtures thereof, which products are distinguished by their substantially higher viscosity as compared with the neutral resins and drying oils themselves.

VICTOR H. TURKINGTON.
WILLIAM H. BUTLER.